US008935438B1

(12) United States Patent
Ivanchenko (10) Patent No.: US 8,935,438 B1
(45) Date of Patent: Jan. 13, 2015

(54) SKIN-DEPENDENT DEVICE COMPONENTS

(75) Inventor: Volodymyr V. Ivanchenko, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 15 days.

(21) Appl. No.: 13/171,085

(22) Filed: Jun. 28, 2011

(51) Int. Cl.
*G06F 3/00* (2006.01)
*G06F 1/16* (2006.01)
*H05K 5/00* (2006.01)
*H05K 7/00* (2006.01)

(52) U.S. Cl.
USPC ............... 710/16; 361/679.41; 361/679.31

(58) Field of Classification Search
USPC ........ 710/16, 8; 709/224; 361/679.41, 671.31
See application file for complete search history.

(56) References Cited

U.S. PATENT DOCUMENTS

| 6,397,327 | B1* | 5/2002 | Klebanov .......................... 713/1 |
| 2004/0088180 | A1* | 5/2004 | Akins, III .......................... 705/1 |
| 2006/0026280 | A1* | 2/2006 | Sadovsky et al. ............. 709/224 |
| 2006/0080481 | A1* | 4/2006 | Woodings et al. ............... 710/36 |
| 2009/0036175 | A1* | 2/2009 | Brandenburg et al. .... 455/575.1 |
| 2010/0078343 | A1* | 4/2010 | Hoellwarth et al. .......... 206/320 |
| 2011/0015496 | A1* | 1/2011 | Sherman et al. ............... 600/301 |
| 2011/0064254 | A1* | 3/2011 | Li et al. .......................... 381/334 |
| 2012/0131230 | A1* | 5/2012 | Ady et al. .......................... 710/8 |

OTHER PUBLICATIONS iMainGo 2 Review (black)—Portable Speakers—CNET Reviews, Oct. 23, 2010, http://web.archive.org/...1023131129/http://reviews.cnet.com/portable-speakers/imaingo-2-black/4505-11313_7-33060591.html?*
"BoxWave Keyboard Buddy iPhone case review—Engadget", Jan. 5, 2011, http://www.engadget.com/2011/01/05/boxwave-keyboard-buddy-iphone-case-review.*

* cited by examiner

*Primary Examiner* — Farley Abad
(74) *Attorney, Agent, or Firm* — Novak Druce Connolly Bove + Quigg LLP (57) ABSTRACT

Additional components or functionality can be provided for a computing device by coupling the device with one or more device skins. Each device skin can include one or more components that can be utilized by the computing device, such that a user of the computing device can obtain desired functionality by selecting an appropriate skin. The components of the skin can be powered by the computing device, such as through wired or wireless power coupling. The computing device can determine an appropriate control scheme for the skin when the skin is coupled with the device, enabling a user to utilize the various components of the skin as if those components were part of the computing device.

26 Claims, 6 Drawing Sheets

SKIN-DEPENDENT DEVICE COMPONENTS

BACKGROUND

People are utilizing computing devices to perform an increasing variety of tasks. For example, portable computing devices such as tablet computers and smart phones are being used to take high quality pictures, record audio and video, and interface with various other devices. Further, additional types of input are being utilized, such as motion or touch input, which require specific sensors or components. In many instances, particularly for portable devices that have a limited form factor, it is not possible to include all the possible components and functionality that various users might want without significantly increasing the size and cost of the computing device. Further, for portable and mobile devices with limited battery life, operating such a large number of components can provide an unnecessary drain on the battery. Further still, the resource requirements (such as processing capacity and bandwidth) to support such a large number of components can be significant, which can negatively impact the performance of a device, particularly small portable devices with limited processing capability.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing varying types of functionality with an electronic device. In particular, various embodiment provide one or more "skins" that can be utilized with a portable computing device not only to provide some amount of protection for the device (e.g., protection against scratches or other such damage), but also to expand the functional capabilities of the device. In some embodiments, different skins can be available for the same computing device, with each skin including one or more different components or functional elements that can be utilized with the computing device. Using such an approach, different users can obtain selections of components that each user wants with the computing device and exclude at least some of the components that a given user may not care about, thus providing desired functionality and flexibility without having to significantly increase the size of the computing device or provide an unnecessary drain on resources.

In at least some embodiments, one or more skins can be provided that can be used with one or more types of electronic device. Each type of skin can include a specific set of components, as may be appropriate for different types of user or different types of usage. For example, one skin might include multiple cameras useful for three-dimensional imaging, while another skin might not include cameras at all, but might instead provide touch or squeeze input capability. Similarly, one skin might provide multiple speakers for surround or directional sound capabilities, while another skin might provide infrared emitting and detecting elements for providing gesture input. Various skins might also include various combinations of these and other such components.

The skins in various embodiments can communicate with a computing device in various ways. In some embodiments, one or more physical contacts or ports on the device can contact or be coupled with one or more contacts or ports on the computing device. In other embodiments, the skin might have wireless communication capability that can communicate with one or more wireless communication elements of the computing device. Similarly, the skin might include its own battery power or might draw power from the computing device. If the skin draws power from the device, the skin can obtain power through one or more physical power contacts, or can obtain power through another mechanism such as through an inductive or capacitive power source of the computing device.

Using such an approach, a user can have the flexibility of obtaining a new skin when wanting to obtain additional functionality, without forcing the user to instead obtain a whole new computing device. Similarly, if the user has one or more skins that are useful to the user, the user can purchase a new computing device that is compatible with those skins, without having to pay for the components of the skins again. Such an approach can provide flexibility and cost savings for the user, and can allow device manufacturers to provide a variety of functionality while keeping the cost of the individual devices and skins relatively low.

Further, the ability to move various components to a device skin can further reduce the size and expense of the associated computing device. For example, there might be one or more components that make sense in at least some embodiments to leave with the computing device, such as a main processor, at least one memory device, at least one display element, and at least one input mechanism, whereby the device can still be used without a skin. Such a device can be relatively small and inexpensive to produce. Various other components can be moved to the skin, as may include imaging elements, audio and video elements, touch sensitive materials, pressure sensitive materials, proximity sensors, electro-magnetic sensors, temperature sensors, bending sensors, acceleration or inertial sensors, accelerometers, global positioning systems, electronic gyroscopes, LEDs, wireless components, keypads, keyboards, ports, light sensors, and the like. There can be different control schemes for each skin that enable the device to take advantage of the components of the skin. These schemes can use information stored with the skin or, for example, downloaded from a provider associated with the skin.

In many embodiments, the skin will not significantly change the form factor of the device, and can be as thin as one or two millimeters thick or less in some embodiments (as many depend at least in part upon the type of components included). In some embodiments, however, the computing device can be used with a "shell" or other component that might provide various functionality and be of a substantially different size or shape than the computing device, but might utilize basic functionality such as the processor of the computing device. In such an instance, the shell might be a "dummy device" that requires the "brains" of the computing device to operate. This can include, for example, a monitor or notebook shell, an automotive navigation system, a media center, or other such device. Such an approach enables a user to utilize any of a number of different type of devices at various locations by coupling the computing device with the shell device, such as by sliding the computing device at least partially within the shell. Further, the shell devices then can provide a customized user experience as various types of information such as user preferences or settings of the computing device can be used to control the components of the shell device.

Various other applications, processes and uses are presented below with respect to the various embodiments.

Figure 1:
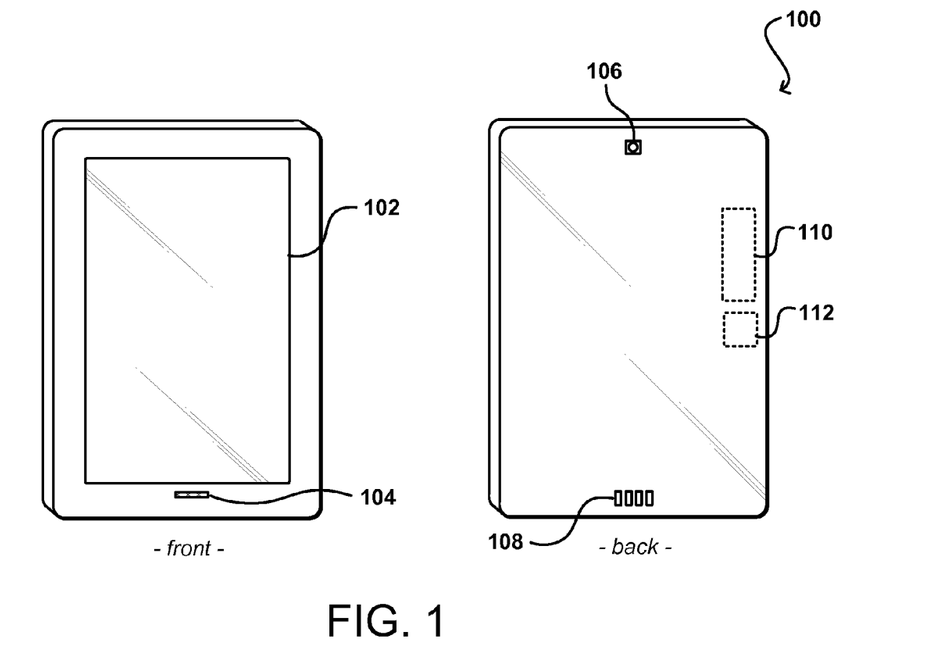
FIG. 1 illustrates front and back views of an example computing device that can be used in accordance with various embodiments.

FIG. 1 illustrates front and back views of an example computing device 100 that can be used in accordance with various embodiments. Although a portable computing device (e.g., a smart phone, an electronic book reader, or tablet computer) is shown, it should be understood that various other types of electronic device that are capable of determining, processing, and/or providing input or output can be used in accordance with various embodiments discussed herein. The devices can include, for example, notebook computers, personal data assistants, cellular phones, video gaming consoles or controllers, and portable media players, among others.

The computing device 100 in this example includes a relatively small number of components or elements with respect to conventional devices, although additional components can be provided with other devices in accordance with the various embodiments. In this example, the computing device includes basic functional components (not shown in FIG. 1) for such a device, including at least one device processor and processor memory operable to store and execute instructions on the device. The example device 100 includes a display screen 102 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc.

The example computing device also includes a relatively high resolution camera 106 on a back of the device, as may be used as a primary image capture element of the device. The camera might include lenses or focusing elements of a certain thickness that can make it desirable in at least some embodiments to include the camera within the casing of the device. The image capture element may be, for example, a camera, a charge-coupled device (CCD), a motion detection sensor, or an infrared sensor, or can utilize another image capturing technology. The computing device in this example also includes a microphone 104 or other audio capture element capable of capturing audio data, such as may be used to enable a user to provide audio input in at least some embodiments.

The can also include device at least one communication mechanism 110, such as may include at least one wired or wireless component operable to communicate with one or more other electronic devices. The device also includes a power mechanism 112, such as may include a battery operable to be recharged through conventional plug-in approaches, or through other approaches such as capacitive charging through proximity with a power mat or other such device. The device also includes at least one physical contact mechanism 108 (e.g., magnetic, conductive, or inductive) that can be used to couple the device with another component, such as a device skin as discussed elsewhere herein. Such a mechanism can be used for various purposes, such as to provide power from the device power mechanism 112 to power the other component, or to enable communications between the device and the other components. Some embodiments might utilize multiple physical contacts for different purposes, or might not include any physical contacts. For example, the power mechanism 112 might include one or more mechanisms for providing power wirelessly (e.g., inductively or capacitively) to the external device, and the communication mechanism 110 might provide one or more mechanisms for providing wireless communication with the external device. Any appropriate mechanism for providing wireless communications and/or power can be used as known or developed in the art for such purposes. Various other elements and/or combinations are possible as well within the scope of various embodiments.

Figure 2:
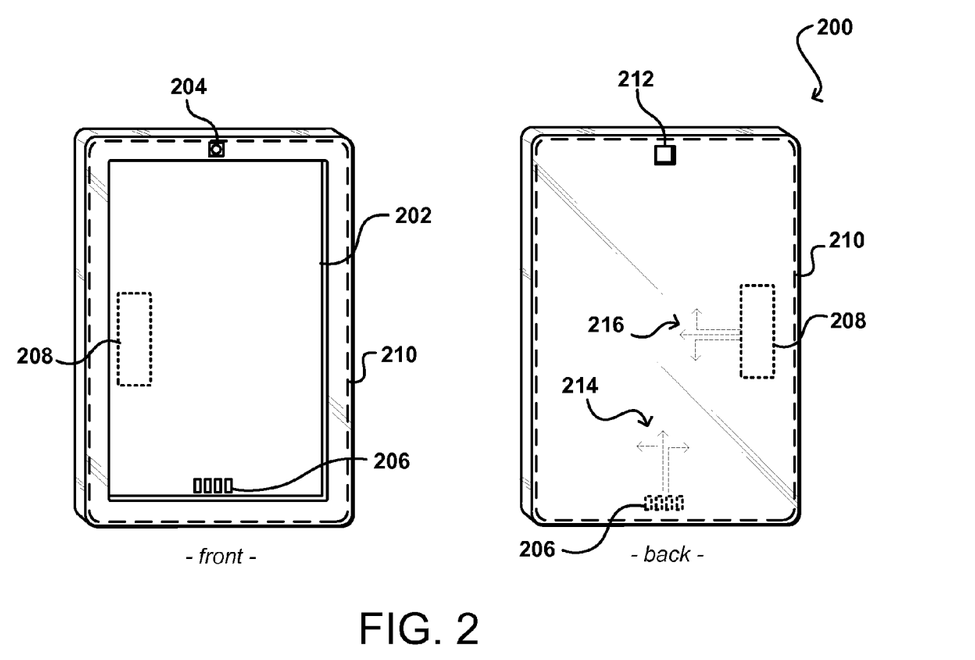
FIG. 2 illustrates front and back views of an example skin or casing that can be used with a computing device such as that illustrated in FIG. 1.

FIG. 2 illustrates front and back views of an example device skin 200 that can be used in accordance with various embodiments. In this example, the skin takes the form of a protective cover that fits around one or more outer surfaces of a computing device such as that illustrated in FIG. 1. The skin can be a rigid, semi-rigid, or flexible housing, casing, or member, as may be formed out of an appropriate lightweight material such as a plastic, rubber, fiber, or polymer material. In this example, the skin can be a flexible and/or pliable material that can be stretched to fit over the edges of the device, although other protective cover-like approaches can be used as well within the scope of various embodiments as discussed elsewhere herein. In this example, the skin has a shape substantially matching an outer shape of a respective computing device, with the inner surface of the skin designed to substantially match and/or contact at least a portion of the outer surface of the device. The walls, edges, or other such portions of the skin can be relatively thin, such as on the order of a few millimeters or less in at least some embodiments, such as to not substantially change the overall size or shape of the device when coupled with the skin. In at least some embodiments, the outer surface of the skin might have a slight texture to prevent the device from slipping, etc.

As illustrated in FIG. 2, there can be any of a number of different functional components included with such a device skin. These can include both "active" elements that can require instructions and/or power from a coupled device, such as cameras and speakers, as well as "passive" elements that might not require power and/or instructions from a coupled device, such as may include solar cells, squeeze detectors, or force sensing resistors (FSR), such as may be used to provide Interpolating Force-Sensitive Resistance Technology (I.F.S.R.), which provides tactile feedback (in terms of depression) as well as power and pressure location information. In this example, the skin includes a front-facing camera 204, as may be used with video conferencing or other such applications. The skin in this example also has a pressure-sensitive outer material 210 to enable a user to provide input by squeezing or otherwise applying pressure to one or more locations on the skin, relative to a coupled computing device. Depending upon the type of casing material and/or design of the skin, these components can have wires, printed pathways, or other transmission mechanisms (not shown in FIG. 2) embedded in the material of the skin or located on (or at least partially in) an inner surface of the skin 214, 216, as may contact a coupled device.

As discussed, the skin can communicate with a coupled computing device, and in some embodiments can also draw power from a coupled computing device. As illustrated in FIG. 2, this can be provided using a physical contact mechanism 206 and/or a wireless mechanism 208. As discussed with respect to FIG. 1, wireless communication and/or power transfer can be used between the skin and the computing device, as well as communication and/or power transfer over physical connections. For example, bringing the contacts 108 of FIG. 1 in contact with the contacts 206 of FIG. 2 can enable the device to transfer power or communications to the device. Similarly, at least one wireless component 208 can be used to provide similar functionality wirelessly, or without a physical connection. Various other options can be used as well within the scope of the various embodiments.

The shape of skin can vary based at least in part upon aspects of a computing device to be coupled with the skin. For example, the skin is shown to have a large front opening 202 that can provide one or more functions for the skin. In at least some embodiments, the opening is large enough to enable the flexible skin to be slipped over an outer edge of a computing device. The opening can also be shaped to allow access to one or more components of a coupled device, such as the display screen 102 and microphone of the device of FIG. 1. Other openings can be provided as well as appropriate, such as the opening 212 on the back of the skin to prevent blocking the view of the high resolution camera 106 of the device in FIG. 1.

Figure 3:
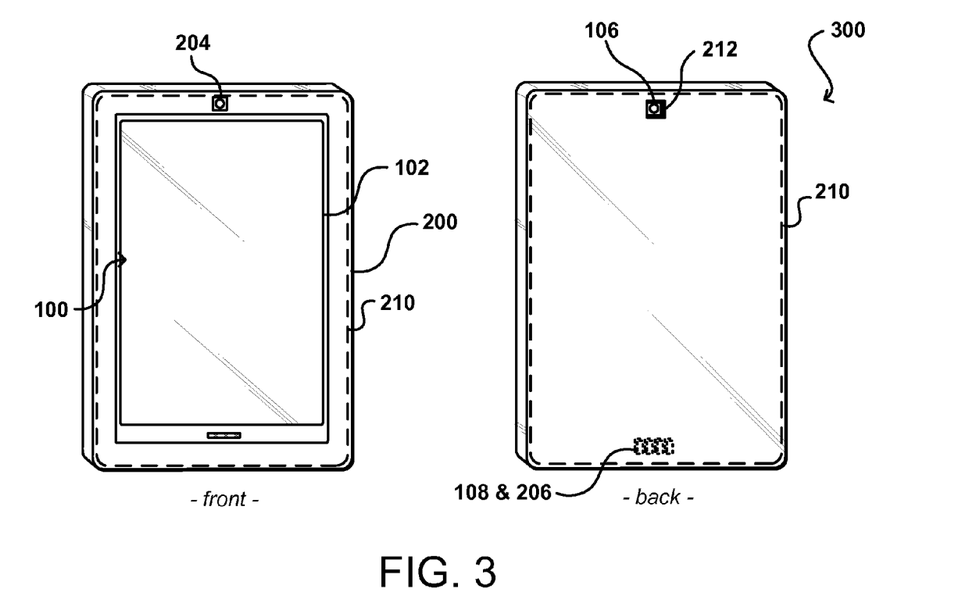
FIG. 3 illustrates front and back views of an example skin coupled with a portable device in accordance with one embodiment.

FIG. 3 illustrates a situation 300 where the example skin 200 of FIG. 2 has been coupled with the computing device 100 of FIG. 1. As can be seen, the basic form factor (i.e., size and shape of the computing device) is substantially unchanged with the skin in place. Further, elements such as the display screen 102 and high resolution camera 106 are still able to be utilized while the skin is coupled, although in some embodiments one or more components might be covered or obstructed based upon an intent, design, or use of the skin. Also, the coupled device and skin enable the device to utilize the components of the skin, including the front-facing camera 204 and pressure-sensitive material 210. In this example, the physical contacts 108 of the device are brought into contact with the physical contacts 206 of the skin, enabling the device and skin to work together as a single device in at least some embodiments, although wireless and other approaches can be used as well as discussed and suggested elsewhere herein.

Figures 4, 5:
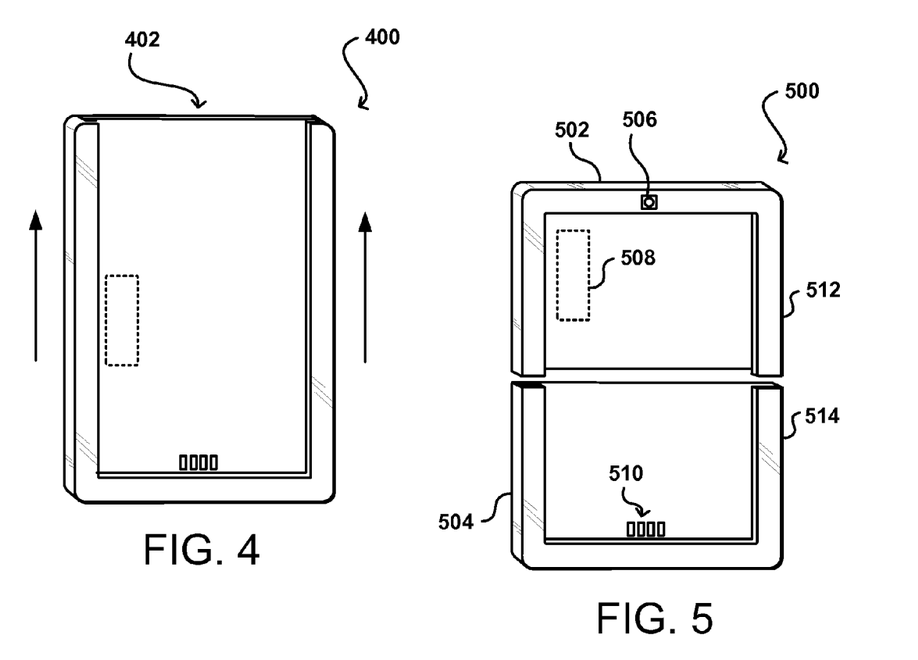
FIG. 4 illustrates an example skin that can be used in accordance with various embodiments.
FIG. 5 illustrates an example skin that can be used in accordance with various embodiments.

It should be understood from the present disclosure that there can be various types of skins with various selections or combinations of components that can be used with various types of computing devices within the scope of the various embodiments. For example, FIG. 4 illustrates an example skin 400 that is intended to slide "over" an exterior of a computing device in a specific direction and substantially lock into place when the computing device is fully received in the skin. The skin in this embodiment includes an opening 402 or receiving portion into which the computing device is to be introduced. Such a skin can be substantially rigid in at least some embodiments, providing for protection against drops or other types of impact. FIG. 5 illustrates another type of skin 500 that includes multiple pieces that are designed to lock together around a device. Such a skin can also be relatively rigid, and can provide protection around all edges of the device. It should be understood that a skin can be divided into two or more sections along any appropriate plane of the skin, and can use any appropriate mechanism for locking together (or otherwise coupling) two physical members.

One advantage to a multi-part skin such as that illustrated in FIG. 5 is that the skin can provide further flexibility. For example, if the skin has "upper" and "lower" portions, there might be different combinations of upper and lower portions that can be selected by a user. In this example, the upper portion 512 includes a camera 506 and a wireless component 508, while the lower portion contains a physical contact 510. If the device to be coupled provides both communication and power wirelessly, the user might select a different bottom portion that instead includes a wireless connection. The user might alternatively want to select a bottom portion that also includes multiple speakers, a USB connection, a second display screen, or any other such component, which can be combined with the upper portion to form a customized skin for the device. Such approaches enable a user to select two or more connectable skin portions that each have desired components without unwanted and/or duplicative components upon combination, which can increase the flexibility of component combinations available to a user without unnecessarily increasing the cost. Various other options can be utilized as well as should be apparent in light of the present disclosure.

Figure 6:
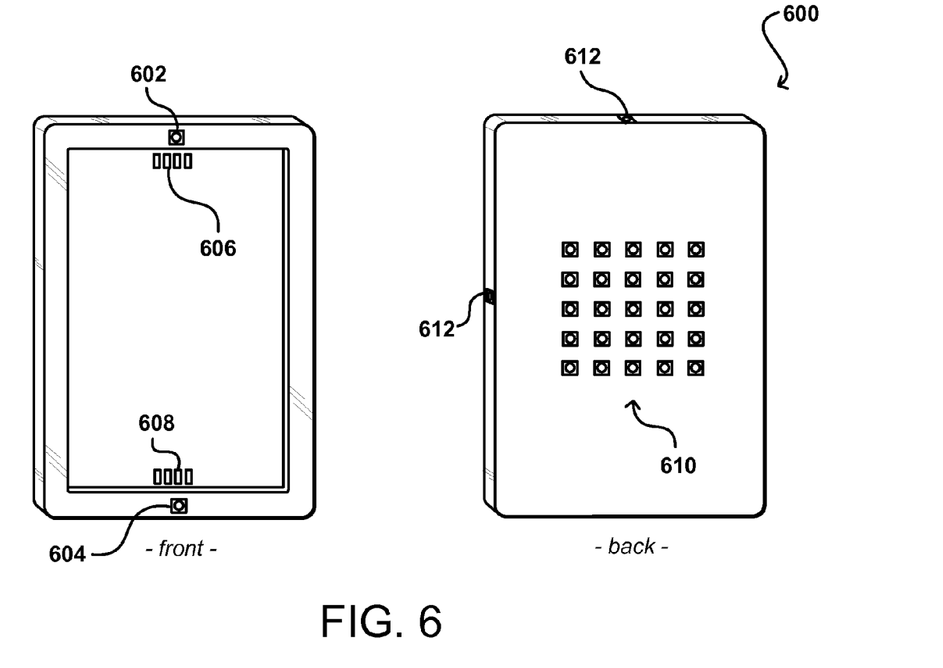
FIG. 6 illustrates front and back views of an example skin that can be used in accordance with various embodiments.

As discussed, different skins can include different selections and/or combinations of components that can provide functionality desirable to certain types of users, or for certain uses or applications. For example, FIG. 6 illustrates front and back views of a skin 600 that provides a variety of imaging elements enabling various types of image information to be captured around the device. In this example, there are two front-facing cameras 602 enabling stereoscopic and/or three-dimensional image information to be captured in a view from the front of the device, as may be used for video conferencing or for gaming purposes. The example skin also includes a camera 612 on each edge of the skin enabling a substantially 360 degree view around the skin. In this example, the skin also has an array of imaging elements 610 on a "back" surface of the skin. Such a camera array enables the image information from each camera to be shifted spatially, in order to provide auto-focusing without having a relatively thick focusing mechanism. Further, the amount needed to shift the various images can be used to determine the distance to various objects in the captured image information, and aggregated to provide for three-dimensional imaging. There can be additional or fewer cameras in various arrays, but in at least some embodiments a balance is struck between enough cameras to do sufficient shifting and a small enough number of cameras that the amount of captured image information is not overwhelming with little additional benefit. In this example, a 5×5 array provides a good balance for at least some applications. This example skin also shows two sets of physical contacts 606, 608, one for communications and one for power. It should be understood that there can be additional or fewer physical contacts of any appropriate type known for transmitting communications and/or power.

In additional to being able to capture image and/or video information for conventional purposes, such elements can also provide for motion or gesture input from any direction around the device. For example, a user can make a gesture that can be included in image information captured by one or more image capture elements, which can be analyzed to determine the type of gesture and, thus, the appropriate input to the device. In at least some embodiments, at least a portion of these image capture elements might be infrared (IR) sensors or other such elements operable to capture radiation over a specific range of wavelengths. In such a situation, the skin might also include one or more IR emitters or other such components.

Figure 7:
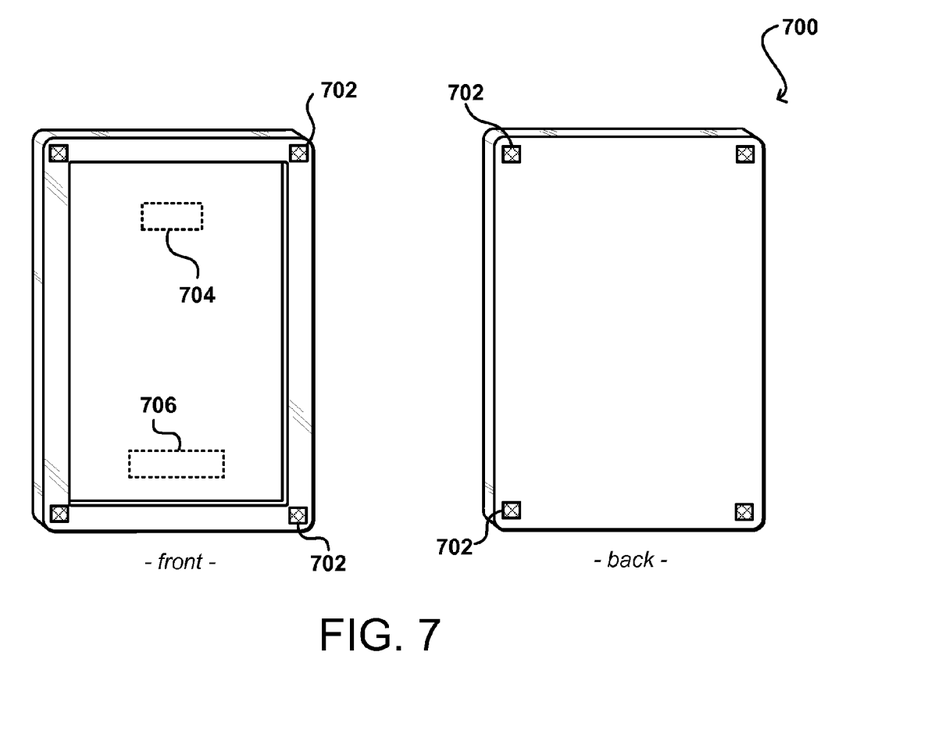
FIG. 7 illustrates front and back views of an example skin that can be used in accordance with various embodiments.

FIG. 7 illustrates another example skin 700 wherein the skin does not include any imaging elements, but instead includes an array of speakers 702 on the front and back of the skin. It should be understood, however, that the speakers could also (or alternatively) be placed on the sides, edges, or corners of the skin in other embodiments. Using such a skin, a device can provide audio playback in surround sound. Further, having an array of speakers enables directional sound to be emitted, such that a user playing a game or watching a movie can hear sounds that appear to come from specific directions corresponding to the content being accessed on the device. In some embodiments, these audio elements could additionally (or alternatively) capture audio information, such as to capture three-dimensional sound around the device. In at least some embodiments, such an array enables sound to be captured from specific directions, such as from the direction of a specific person nearby. In some embodiments, sound captured from other directions can be used to filter out background noise from the directionally-captured audio. Various other approaches can be utilized as well within the scope of the various embodiments.

Figure 8:
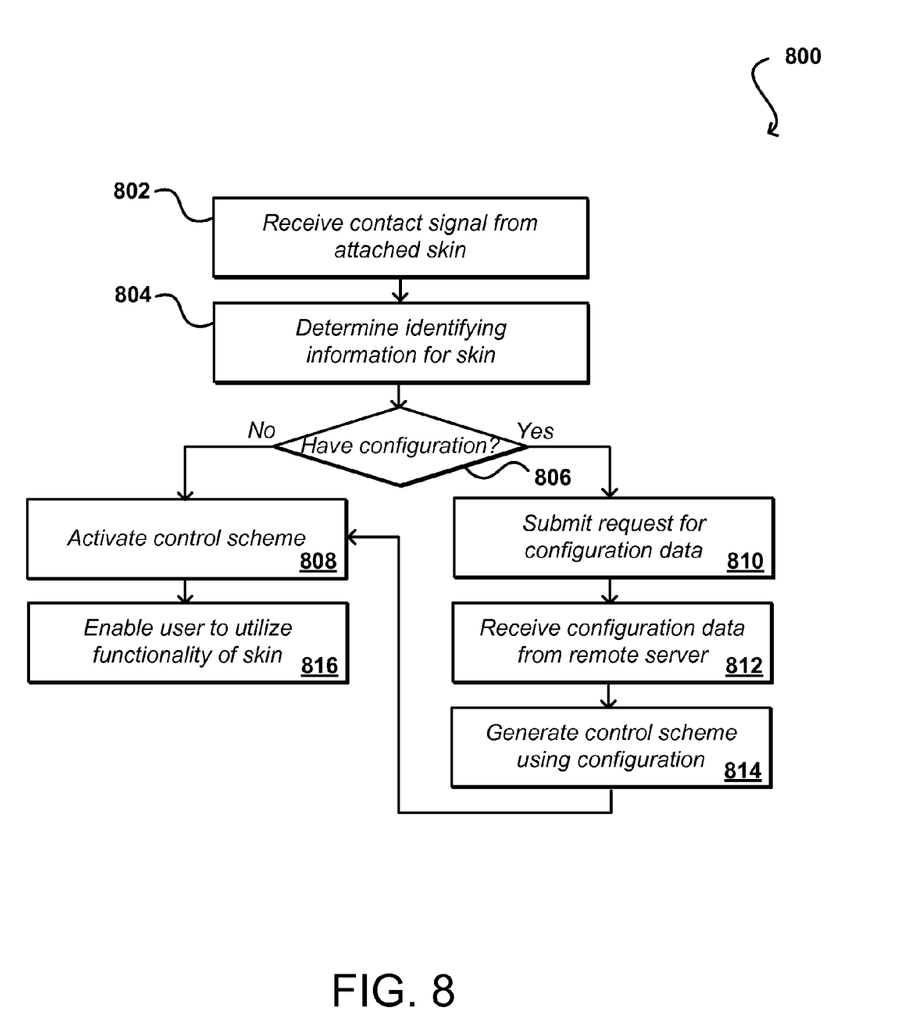
FIG. 8 illustrates an example process for adding functionality to a device through use of a skin that can be used in accordance with various embodiments.

FIG. 8 illustrates an example process 800 for utilizing additional functionality provided through a device skin that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a contact signal is received by a computing device when a device skin is brought into contact and/or coupled with the computing device 802. In some embodiments, this signal might be received when one or more physical contacts of the skin are brought into contact with one or more physical contacts of the device, or when a short-range wireless signal of the skin is detected by at least one wireless component of the computing device. In response to the signal, the device can attempt to determine identifying information for the skin 804. In many embodiments, identifying information will be provided from the skin itself through direct communications with the device. The information can include any appropriate information, such as a serial number, skin type identifier, configuration information, or capability information that might be stored on a memory chip or other appropriate location of the device skin.

Upon obtaining identifying information for the skin, the computing device can determine whether the computing device has appropriate configuration information for the skin 806. This can include, for example, determining whether the computing device is aware of the components of the particular skin that can be utilized, commands or protocols needed to control these components, power requirements for the device, and other such information. If the device does not have the necessary information, and cannot obtain the information directly from the skin, the computing device can attempt to obtain the information from an appropriate source, such as by submitting a request for configuration information over at least one appropriate network 810, such as the Internet or a wireless network. When the configuration information is subsequently received from a remote server 812 or other such source, the computing device can use the information to generate an appropriate control scheme 814 that can enable the computing device to control the components of the device and utilize those components as if the components were part of the computing device itself.

Once the computing device has determined identifying and/or configuration information for the skin, and has generated or otherwise obtained an appropriate control scheme, the device can activate that control scheme 808 to enable the user to utilize the functionality of the skin 816 as if the components of the skin are part of the device itself. The control scheme information can be stored on the computing device such that upon subsequent couplings of that type of skin to the computing device, the control scheme can be automatically loaded and/or activated. For multiple skins, the computing device can automatically load and/or adjust the current control scheme based at least in part upon the skin that is currently coupled with the device.

In some embodiments, there can be different functionality activated on the computing device as well based at least in part upon the skin that is currently coupled (or not coupled) with the computing device. For example, a user might utilize one skin at work that has recording and projection elements for meetings. The device might correspondingly switch into a "work" mode where the device prioritizes applications such as meeting organizers, presentation applications, etc. If the user goes home and swaps in another skin that includes surround sound and a three-dimensional display, the device could enter another mode where other applications are prioritized, such as media players or gaming applications. Methods of notification and communication with a user also can be updated based on the current mode or skin, such as where a notification might be provided by a flashing LED when the computing device is not coupled with a skin, but might involve a scrolling message on a side of the skin when the skin is in place. Many other variations are possible as well, as should be apparent in light of the present disclosure.

In some embodiments, two or more skins can be "stacked" to obtain additional functionality. For example, a transparent outer layer that is capable of providing touch or pressure input might be able to be placed over an inner skin that has cameras and display elements. Similarly, an inner skin might provide functionality such as Wi-Fi, 4G communication capability, and other functional aspects, while an outer skin might provide a full-skin display area, audio array, or other such set of more user-perceptible components. In such an embodiment, certain skins might be able to communicate with other skins as well as a computing device, whether over wireless communications or through contacts on an inner and outer surface of a skin. Similarly, power can be provided to multiple skins wirelessly or through contacts or other physical mechanisms on an inner and outer surface of a skin.

A skin can also be utilized to provide specific functionality that might not be appropriate for many users, but might be prohibitively expensive if an entire custom device needed to be generated. For example, a skin might be generated that covers a display screen of the computing device. A portion of the skin might be able to, based at least in part upon a state of the pixels or portions of the display, dynamically generate an array of bumps or points of varying intensity that enable a blind person to be able to obtain information from the display. Similarly, another skin might be able to generate vibrations that can be detected by deaf users, enabling those users to better appreciate music or sounds corresponding to a particular display, etc. These skins can be produced much more cost-effectively than generating entire devices for those particular markets, and the cost to the end user can be reduced as well.

As mentioned above, additional components for use with a computing device do not need to be supplied via a mechanism in the form of a skin or protective casing, for example, but can also be supplied in many other potential shapes and sizes in other embodiments. For example, many types of device rely on some type of processor, display, memory, communication mechanism, or other such components. Since a computing device typically will incorporate at least some of these components, these components can be removed from the external device if the external device can leverage those components from the computing device. For example, a television might be a "dummy" terminal that simply accepts a digital cable signal, for example, but can become an Internet-capable television by enabling the television to couple with a computing device that has a processor, browser software, an Internet connection, and other such aspects. Further, a user can take that computing device and plug it into the navigation system of that user's car whereby the navigation system can also be connected to the Internet, can access routes stored by the user on the device, etc. Even basic devices such as toasters or washing machines can become smart devices if they are able to couple with the computing device. The computing device can act as the brain for any such "dummy terminal" in accordance with various embodiments, where each dummy terminal offers at least one function or component not otherwise offered, at least in the same format, on the computing device.

In order to provide functionality such as that described above, FIG. 9 illustrates an example set of basic components of a computing device 900 that can couple with a device skin in accordance with various embodiments. As discussed, a significant amount of functionality can be moved from the device to the skins in various embodiments, simplifying the operation of the device itself. In this example, the device includes at least one processor 902 for executing instructions that can be stored in at least one memory device or element 904. As would be apparent to one of ordinary skill in the art, the device can include many types of memory, data storage, or non-transitory, computer-readable storage media, such as a first data storage for program instructions for execution by the processor 902, the same or separate storage for storing images or data, a removable storage memory for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc.

Figure 9:
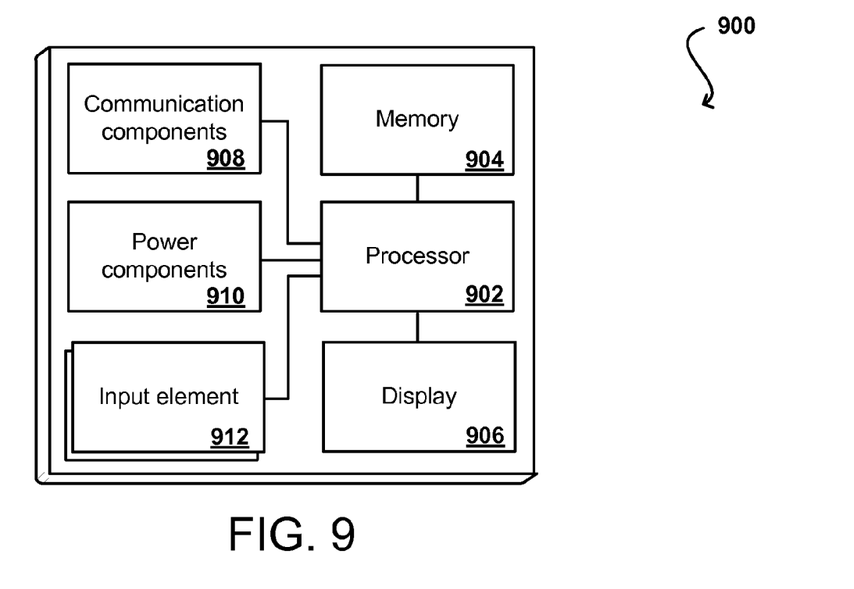
FIG. 9 illustrates an example configuration of components of a portable computing device that can be used in accordance with various embodiments.

The example device also includes at least one communication mechanism or set of communication components 908, such as may include at least one wired or wireless component operable to communicate with at least one skin coupled with the device. The example device also includes a power system 910, such as may include a battery operable to be recharged through conventional plug-in approaches, or through other approaches such as capacitive charging through proximity with a power mat or other such device. The power components also can provide power to one or more device skins through contact or wireless mechanisms, as discussed elsewhere herein. In order for the device to function without a skin, the example device can also include one or more input elements 912, such as buttons, switches, and the like. Various other elements and/or combinations are possible as well within the scope of various embodiments.

Figure 10:
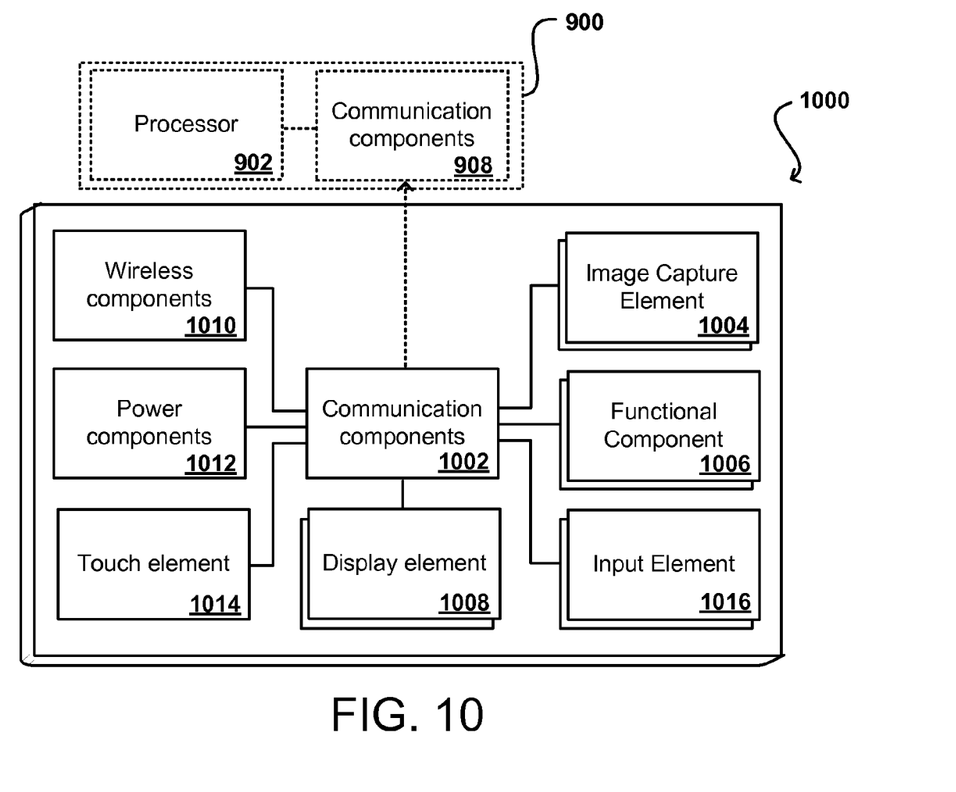
FIG. 10 illustrates an example configuration of components of a skin for a portable computing device that can be used in accordance with various embodiments.

FIG. 10 illustrates an example set of components of a device skin 1000 that can couple with a computing device, such as the computing device illustrated in FIG. 9, in accordance with various embodiments. It should be understood that reference numbers for similar elements are carried over between figures for purposes of simplicity of explanation, but that such use should not be interpreted as limiting the scope or variations of the various embodiments. In this example, it can be seen that the skin does not include a main processor, but instead uses one or more communication components 1002 to utilize a processor 902 of the computing device 900 via one or more communication components 908 of the computing device. It should be understood, however, that additional processors can be provided with various skins in accordance with various embodiments. The example skin can also include one or more power components 1012 operable to receive power from the computing device 900.

Any of a number of different components can also be included with a device skin in accordance with various embodiments. For example, a device skin can include one or more image capture elements for purposes such as conventional image and/or video capture. Image capture elements can be placed in any appropriate location, such as on the front, back, sides, or corners of the skin, and there can be any appropriate number of capture elements of similar or different types. Each image capture element may be, for example, a camera, a charge-coupled device (CCD), a motion detection sensor, or an infrared sensor, or can utilize another image capturing technology. The computing device can also include at least one microphone or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The skin 1000 in this example also includes at least one or more other functional components 1006, such as may include a motion-determining element, orientation-determining element, position-determining element, illumination element, light sensor, motion detector, tactile feedback element, solar cell, and/or other such elements discussed and suggested herein. These elements can include, for example, accelerometers, inertial sensors, electronic gyroscopes, electronic compasses, and GPS elements. Various types of motion or changes in orientation can be used to provide input to the device that can trigger at least one control signal for another device. The skin can also include touch and/or pressure sensitive material 1014 on one or more areas of the skin as well, such as on the sides or back of the skin. While in at least some embodiments a user can provide input by touching or squeezing such a material, in other embodiments the material can be used to detect motion of the skin through movement of a patterned surface with respect to the material. A touch element also can provide tactile feedback to a user in at least some embodiments, in place of or in addition to a separate tactile component. The skin can also include one or more additional display elements 1008, such as a touch screen, electronic ink (e-ink) display, organic light emitting diode (OLED) or liquid crystal display (LCD), and the like. The skin can also include at least one additional input element 1016 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example skin can also include one or more wireless components 1010 operable to communicate with one or more electronic devices other than a skin but within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art.

Figure 11:
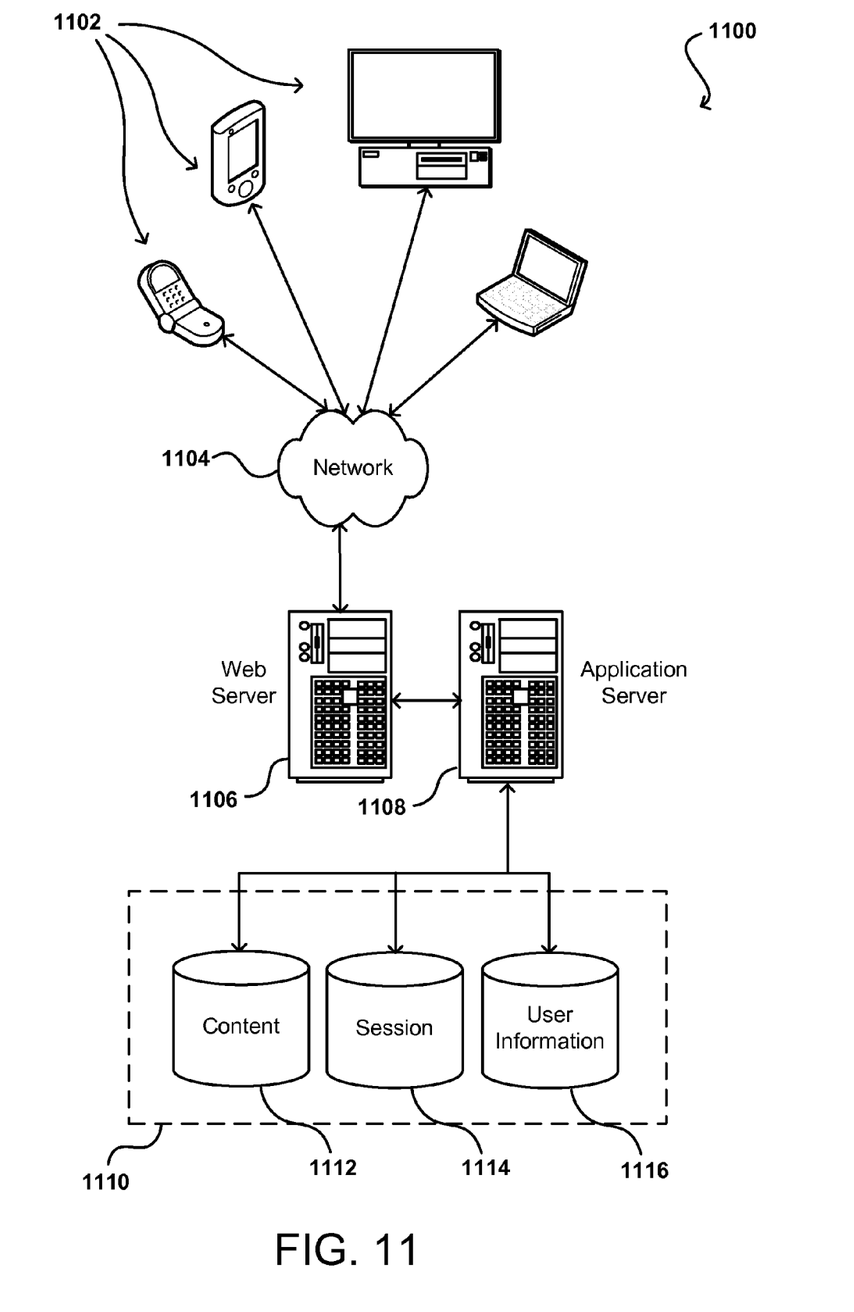
FIG. 11 illustrates an environment in which various embodiments can be implemented.

As discussed, different approaches can be implemented in various environments in accordance with the described embodiments, such as to determine and/or obtain configuration information for a device skin coupled with a computing device. As an example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for expanding the capability of a portable computing device, comprising:

a portable computing device including a device processor and at least one memory device storing instructions capable of being executed by the processor to perform any of a set of device instructions, the portable computing device further including a power source operable to power the processor; and a device skin comprising at least two skin portions that are connectable to encase at least a back surface of the portable computing device, each of the at least two skin portions including at least one functional device component, each of the at least one functional device component for a respective skin portion having a different function, the device skin having an inner surface shaped to match at least a portion of an outer surface of the portable computing device and an outer surface shaped to substantially track a shape of the portable computing device, the device skin configured such that, when the computing device is at least partially contained in, and coupled with, the device skin, the device skin is operable to:

communicate with the portable computing device using at least one communication mechanism of the device skin, wherein the communication includes receiving at least one instruction from the portable computing device and transmitting, to the portable computing device in response to the at least one instruction, information associated with a hardware-related feature provided by the at least one functional device component;

obtain power for the at least one functional device component using at least one power transmission mechanism of the device skin, and cause the portable computing device to switch to a selected mode of operation, the selected mode being selected based, at least in part, on a property associated with the at least one functional device component included with the device skin, wherein the at least one functional device component translates one or more input signals into one or more output signals, wherein the portable computing device is operable to, when coupled with the device skin, utilize the at least one functional device component as if the at least one functional device component is part of the portable computing device, without reducing functional features of the portable computing device, wherein the utilization of the at least one functional device component includes utilizing, by the portable computing device, the information associated with the hardware-related feature provided by the at least one functional device component, wherein the hardware-related feature is configured to operate based at least in part on a user-selected control setting associated with the device skin, and wherein the at least one functional device component includes at least one of an image capture element, an image capture array, an audio capture element, a display element, a motion sensor, a proximity sensor, a touch sensor, a pressure sensor, a light emitting diode, an infrared transceiver, a wireless component, a keypad, a keyboard, a communication port, and a light sensor.

2. The system of claim 1, wherein the portable computing device is further operable to obtain and execute instructions specific to the at least one functional device component when the device skin is coupled with the computing device.

3. The system of claim 2, wherein the device skin is operable to communicate identifying information to the computing device when the device skin is coupled with the portable computing device, the portable computing device operable to use the identifying information to obtain the instructions specific to the at least one functional device component of the device skin.

4. The system of claim 2, wherein the portable computing device is further operable to obtain and execute instructions specific to at least one second functional device component when a second device skin is coupled with the computing device.

5. A functional skin for a computing device, comprising:
a housing having an inner surface shaped to match at least a portion of a computing device capable of being received at least partially into the housing, a thickness between an outer surface and an inner surface of the housing being a fraction of a thickness of the computing device, wherein the housing includes multiple housing portions capable of being coupled together to encase at least a back surface of the computing device, and wherein each of the multiple housing portions includes at least one functional device component;

at least one communication mechanism operable to communicate with the computing device when the computing device is at least partially received into the housing and coupled with the functional skin, wherein the communicating with the computing device includes receiving at least one instruction from the computing device and transmitting, to the computing device in response to the at least one instruction, information associated with at least one hardware-related feature provided by the at least one functional device component, the at least one hardware-related feature being provided without reducing functional features of the computing device; and at least one power transfer mechanism operable to receive power from the computing device when the computing device is at least partially received into the housing and coupled with the functional skin, wherein the at least one functional device component is operable to receive control signals from a processor of the computing device via the at least one communication mechanism and power from the computing device via the at least one power transfer mechanism, provide the at least one hardware-related feature, and provide information associated with the at least one hardware-related feature back to the processor via the at least one communication mechanism, wherein the at least one hardware-related feature is configured to operate based at least in part on a user-selected control setting associated with the device skin, wherein the at least one functional device component enables the computing device to operate in a mode selected based, at least in part, on the at least one functional device component, and wherein the at least one functional device component includes at least one of an image capture element, an image capture array, an audio capture element, a display element, a motion sensor, a proximity sensor, a touch sensor, a pressure sensor, a light emitting diode, an infrared transceiver, a wireless component, a keypad, a keyboard, a communication port, and a light sensor.

6. The functional skin of claim 5, wherein the at least one functional device component further includes at least one passive component operable to provide at least one of information and power to the computing device without requiring control signals from the processor or power from the computing device.

7. The functional skin of claim 5, wherein the functional skin is one of a plurality of types of device skins, each type of device skin having at least one different functional device component capable of being used with the computing device.

8. The functional skin of claim 5, wherein the functional skin is one of a plurality of types of device skins, each type of device skin having a housing shaped to couple with a different type of computing device.

9. The functional skin of claim 5, wherein the housing is formed from at least one of a plastic, fiber, rubber, or polymer material.

10. The functional skin of claim 5, wherein the housing is formed of one of an elastic, rigid, or semi-rigid material.

11. The functional skin of claim 5, wherein the user is able to select one or more housing portions to couple together based at least in part upon a selection of components in each housing portion, wherein the user is able to obtain a selection of functional components of value to the user.

12. The functional skin of claim 11, wherein the selected housing portions provide no redundant functional components.

13. The functional skin of claim 5, further comprising:
a memory device storing identifying information for the device skin, the identifying information enabling the computing device when coupled to determine a control scheme for the at least one functional component of the device skin.

14. The functional skin of claim 5, wherein the at least one communication mechanism is operable to communicate with the computing device using a physical or wireless connection.

15. The functional skin of claim 5, wherein the at least one power transfer mechanism is receive power from the computing device using a physical or wireless connection.

16. The functional skin of claim 5, wherein the at least one functional device component enables the computing device, when coupled with the device skin, to perform at least one of gesture input, three-dimensional image capture, motion detection, and directional audio capture.

17. A method of utilizing one or more functional components of a device skin with a computing device, comprising:

detecting the device skin being coupled with the computing device, wherein the device skin includes multiple skin portions capable of being coupled together to encase at least a back surface of the computing device, and wherein each of the multiple skin portions includes one or more functional components;

obtaining identifying information for the detected device skin;

determining a control scheme for the one or more functional components of the device skin based at least in part upon the identifying information, wherein the control scheme corresponds to a mode of operation selected based, at least in part, on the identifying information for the detected device skin; and using a processor of the computing device, operating the one or more functional components included with the device skin as if the functional components are part of the computing device, wherein the operating the one or more functional components includes transmitting at least one instruction from the computing device to the device skin and receiving at the computing device information transmitted by the device skin, the information being associated with a hardware-related feature provided by the one or more functional components, the hardware-related feature being provided without reducing functional features of the computing device and being configured to operate based at least in part on a user-selected control setting associated with the device skin, wherein additional hardware-related functionality can be provided for the computing device by coupling the computing device with the device skin including the one or more functional components, and wherein the at least one functional device component includes at least one of an image capture element, an image capture array, an audio capture element, a display element, a motion sensor, a proximity sensor, a touch sensor, a pressure sensor, a light emitting diode, an infrared transceiver, a wireless component, a keypad, a keyboard, a communication port, and a light sensor.

18. The method of claim 17, further comprising:

detecting a second device skin being coupled with the computing device;

obtaining second identifying information for the detected second device skin;

determining a second control scheme for one or more functional components of the second device skin based at least in part upon the second identifying information; and using a processor of the computing device, operating the one or more functional components of the second device skin as if the functional components are part of the computing device, wherein different functionality can be provided for the computing device by coupling the second skin with the computing device.

19. The method of claim 17, wherein obtaining identifying information for the detected device skin includes receiving the identifying information directly from the device skin over a physical or wireless connection.

20. The method of claim 17, wherein determining the control scheme for one or more functional components includes submitting a request to a remote source including the identifying information and receiving configuration information for the device skin from the remote source.

21. The method of claim 17, further comprising:

providing power for the one or more functional components of the device skin from a power source of the computing device using a physical or wireless power transfer.

22. A non-transitory computer-readable storage medium storing for instructions for utilizing one or more functional components of a device skin with a computing device, the instructions when executed by a processor of the computing device causing the computing device to:

detect the device skin being coupled with the computing device, wherein the device skin includes multiple skin portions capable of being coupled together to encase at least a back surface of the computing device, and wherein each of the multiple skin portions includes one or more functional components;

obtain identifying information for the detected device skin;

determine a control scheme for the one or more functional components of the device skin based at least in part upon the identifying information, wherein the control scheme corresponds to a mode of operation selected based, at least in part, on the identifying information for the detected device skin; and using a processor of the computing device, operate the one or more functional components included with the device skin as if the functional components are part of the computing device, wherein the operating the one or more functional components includes transmitting at least one instruction from the computing device to the device skin and receiving at the computing device information transmitted by the device skin, the information being associated with a hardware-related feature provided by the one or more functional components, the hardware-related feature being provided without reducing functional features of the computing device and being configured to operate based at least in part on a user-selected control setting associated with the device skin, wherein additional hardware-related functionality can be provided for the computing device by coupling the computing device with the device skin including the one or more functional components, and wherein the at least one functional device component includes at least one of an image capture element, an image capture array, an audio capture element, a display element, a motion sensor, a proximity sensor, a touch sensor, a pressure sensor, a light emitting diode, an infrared transceiver, a wireless component, a keypad, a keyboard, a communication port, and a light sensor.

23. The non-transitory computer-readable storage medium of claim 22, wherein the instructions when executed further cause the computing device to:

detect a second device skin being coupled with the computing device;

obtain second identifying information for the detected second device skin;

determine a second control scheme for one or more functional components of the second device skin based at least in part upon the second identifying information; and using a processor of the computing device, operate the one or more functional components of the second device skin as if the functional components are part of the computing device, wherein different functionality can be provided for the computing device by coupling the second skin with the computing device.

24. The non-transitory computer-readable storage medium of claim 22, wherein obtaining identifying information for the detected device skin includes receiving the identifying information directly from the device skin over a physical or wireless connection.

25. The non-transitory computer-readable storage medium of claim 22, wherein determining the control scheme for one or more functional components includes submitting a request to a remote source including the identifying information and receiving configuration information for the device skin from the remote source.

26. The non-transitory computer-readable storage medium of claim 22, wherein the instructions when executed further cause the computing device to:
provide power for the one or more functional components of the device skin from a power source of the computing device using a physical or wireless power transfer.

* * * * *